United States Patent [19]

Hanks

[11] 4,006,463
[45] Feb. 1, 1977

[54] COMPUTER-PRINT DEVICE CODE CONVERTER

[75] Inventor: Jimmy C. Hanks, Corpus Christi, Tex.

[73] Assignee: Mobil Oil Corporation, New York, N.Y.

[22] Filed: Apr. 29, 1974

[21] Appl. No.: 464,888

[52] U.S. Cl. .................. 340/172.5; 178/26 R; 192/36; 197/52; 340/347 DD
[51] Int. Cl.² .............................................. B41J 1/60
[58] Field of Search ......... 340/172.5, 347 DD, 365; 178/17 C, 26, 17.5; 179/3, 2; 197/52, 36; 235/61 R

[56] References Cited

UNITED STATES PATENTS

| | | | |
|---|---|---|---|
| 3,057,955 | 10/1962 | Hirsch | 178/26 R |
| 3,075,043 | 1/1963 | Reely | 178/26 R |
| 3,403,225 | 9/1968 | Mislan | 179/2 |
| 3,403,225 | 9/1968 | Mislan et al. | 178/17.5 |
| 3,501,747 | 3/1970 | Bungard et al. | 340/172.5 |
| 3,505,474 | 4/1970 | Quatse | 179/3 |
| 3,691,554 | 9/1972 | Marschall | 340/347 DD |
| 3,738,471 | 6/1973 | Van Der Werff et al. | 197/52 |
| 3,742,137 | 6/1973 | Garland | 340/347 DD |
| 3,847,262 | 11/1974 | Higgins | 197/36 |
| 3,892,305 | 7/1975 | Higgins | 197/52 |

*Primary Examiner*—Malcolm A. Morrison
*Assistant Examiner*—Errol A. Krass
*Attorney, Agent, or Firm*—C. A. Huggett; George W. Hager, Jr.

[57] ABSTRACT

A computer generates an output command identifying an alpha-numeric character or symbol to be printed. A code converter decodes the computer output command and converts it to a command which can be recognized by a print device as the same alpha-numeric character or symbol identified by the computer ouptut command.

7 Claims, 2 Drawing Figures

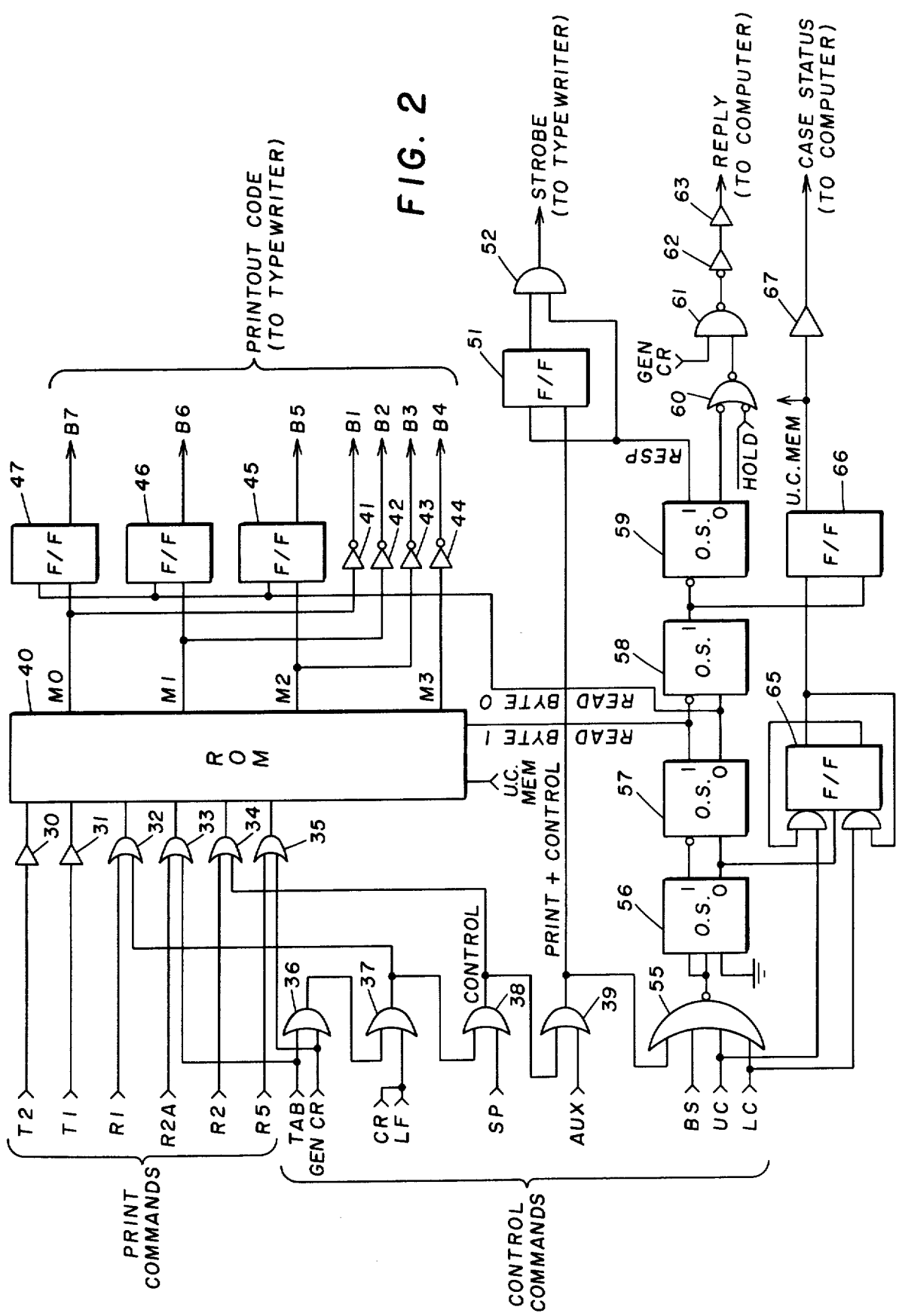

COMPUTER-PRINT DEVICE CODE CONVERTER

BACKGROUND OF THE INVENTION

A print device can respond directly to coded signals from a control computer to provide a printout of information stored within the computer when there is code compatibility between the computer and the print device. These coded signals are in the form of print commands representing alpha-numeric characters or symbols to be printed.

SUMMARY OF THE INVENTION

The present invention is directed toward apparatus for interfacing a control computer with a print device that is not code compatible with the control computer. More particularly, the present invention relates to a code converter which converts computer commands of a first coded format into a second coded format that is compatible with the input requirements of the print device.

More particularly, a computer generates a print command representing a particular alpha-numeric character or symbol to be printed by a print device. The computer also generates an upper case command or a lower case command, indicating whether the character to be printed is to be an upper case character or a lower case character. The code converter generates a case control signal in response to either an upper or a lower case command. The case control signal will be at a first level in response to an upper case command and will be at a second level in response to a lower case command. The code converter decodes the print command under the control of the case control signal to provide a printout signal in a coded format that is compatible with the input requirement of the print device, such printout signal representing both the character or symbol and the case of the character to be printed.

In a further aspect, the code converter generates a first control signal after a predetermined time interval following the generation of a print command or an upper or lower case command by the computer. Decoding of these commands is inhibited during this time interval to allow any ringing on the output lines from the computer associated with the generation of these commands to die away. At the end of this time interval, this first control signal enables the decoding of the computer commands and the generation of the printout signal.

In a still further aspect, the code converter generates a second control signal after a predetermined time interval following the generation of the printout signal. During this time interval, the print device is disabled from accepting the printout signal to allow any ringing on the output lines from the code converter associated with the generation of the data signal to die away. At the end of this time interval, the second control signal enables the print device to accept the printout signal and to print out the character or symbol identified by the printout signal.

BRIEF DESCRIPTION OF THE DRAWINGS

FIG. 2 is a circuit schematic of that portion of FIG. 1 representing the code converter of the present invention.

DESCRIPTION OF THE PREFERRED EMBODIMENT

Figure 1:
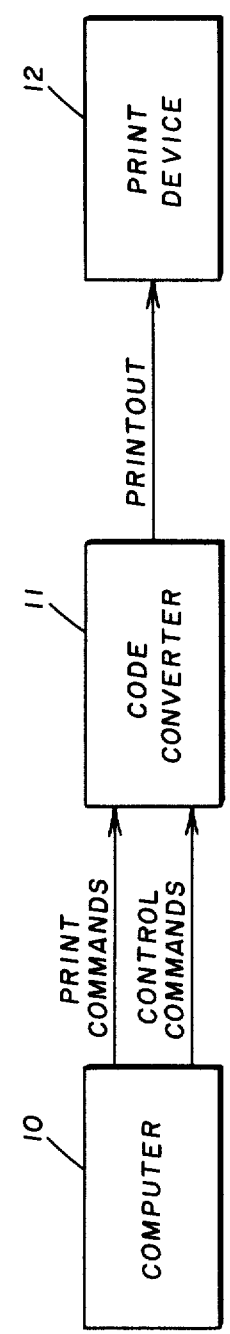
FIG. 1 is a block diagram schematic of one embodiment of the present invention.

Referring to FIG. 1, the code converter 11 of the present invention converts print commands and control commands from a computer 10 into a printout code that is compatible with the input code requirement of a print device 12. The print commands are in the form of tilt and rotate signals and are converted by the code converter 11 to a proper printout signal for the proper character to be printed on the print device 12. The control commands are converted by the code converter 11 to a proper printout signal for selecting the position where the character will appear on the output of the print device 12.

In one embodiment of the invention, the code converter interfaces a PRINTEC-100 Printer of Printer Technology Corporation with an IBM 1800 Control Computer of International Business Machines. The print commands for the typewriter ball are represented as follows:

a. T2 — tilt 2 rows
b. T1 — tilt 1 row
c. R1 — rotate 1 column
d. R2A — rotate 2 columns
e. R2 — rotate 2 columns
f. R5 — rotate 5 columns.

The control commands for the typewriter carriage are represented as follows:

a. TAB — tabulate
b. CR — carriage return
c. LF — line feed
d. SP — space
e. AUX — indicates a character or symbol is ready for conversion
f. BS — backspace
g. UC — shift to upper case
h. LC — shift to lower case.

In response to the foregoing print and control commands, the code converter 11 generates a 7-bit printout signal which controls the operation of the print device 12.

Referring now to FIG. 2, the control commands TAB, CR, LF, and SP are applied through gates 36–39 in conjunction with gates 32–34 to a 1024 × 4-bit read-only-memory 40. The read-only-memory 40 contains the conversion codes for decoding these control commands and for generating the 4-bit output M0–M3 which is applied through inverters 41–44 and flip-flops 45–47 as the 7-bit printout signal B1–B7 to the electric typewriter 12. The output of gate 38, CONTROL, is used to address that portion of the read-only-memory 40 that contains the conversion codes for the TAB, CR, LF, and SP control commands. More particularly, in response to the CR and LF commands, the typewriter carriage is returned to the left margin and the paper advanced one line. In response to the SP command, the typewriter skips a space and in response to the TAB command advances to a selected space.

When it is time for a character or symbol to be printed, the AUX control command is generated by the computer and applied to gate 39 along with the CONTROL signal. Gate 39 provides a PRINT + CONTROL signal. The control commands BS, UC, and LC are applied along with the PRINT + CONTROL signal to gate 55. Any one of these signals sets the output of gate 55 to a logic 0 which triggers the one-shot multivibrator 56. The time delay of multivibrator 56 is sufficient to allow ringing (i.e., any oscillatory transient) on the output lines from the computer 10 to the code converter 11 to die away before the read-only-memory 40 decodes the print commands. At the end of the time delay provided by multivibrator 56, for example, approximately 5.5 milliseconds, the one-shot multivibrator 57 provides the READ BYTE 1 pulse that enables the read-only-memory 40 to decode the print command.

Also, at the end of the time delay of multivibrator 56, the flip-flop 65 is triggered by multivibrator 56 and then set to one of two states, depending upon the last case (upper or lower) selected by the computer commands UC and LC. If an upper case character has been selected by the UC command, flip-flop 65 triggers flip-flop 66 to provide a logic 1 U.C. MEM signal which indicates to the read-only-memory 40 that an upper case character is to be decoded. This logic 1 U.C. MEM signal also sets the level converter 67 to provide a logic 1 CASE STATUS signal to indicate to the computer that an upper case character has been decoded. However, if a lower case character has been selected by the LC command, the U.C. MEM signal will be logic 0, indicating to the read-only-memory 40 that a lower case character is to be decoded and the CASE STATUS signal will be logic 0, indicating to the computer that a lower case character has been decoded.

At the end of the time period of multivibrator 57, the READ BYTE 0 pulse triggers flip-flops 45–47 to store the three high-order bits M0, M1, and M2 of the character or symbol in the read-only-memory 40 to provide for the output bits B5–B7, respectively. After the time period of multivibrator 57, the output of the read-only-memory 40 becomes the four low-order bits of the character or symbol. These four low-order bits are provided by way of inverters 41–44 as the output bits B1–B4, respectively. The 7-bit printout signal, B1–B7, is then accepted by the typewriter in response to a STROBE pulse provided by way of flip-flop 51 and gate 52.

In order to allow any ringing to cease on the input lines to the print device 12 from the code converter 11 before the 7-bit printout code is accepted by the typewriter, the STROBE signal is time delayed by the time period of one-shot multivibrator 58 which may be, for example, approximately 2 microseconds. At the end of this time delay, the one-shot multivibrator 59 is triggered to provide the RESP pulse that enables the flip-flop 51 and gate 52 to provide the STROBE pulse in response to a PRINT + CONTROL signal. The STROBE pulse now instructs the print device to accept the printout signal B1–B7.

Having now described the code converter of the present invention in conjunction with the circuitry illustrated in FIG. 2, it is to be understood that such circuitry is merely representative of one embodiment. In accordance with such embodiment, the following sets forth specific types of circuit components.

| Reference Designation | Description |
|---|---|
| Gates 32–35, 52, 60, and 61 | SN7400 Texas Instruments |
| Inverters 30, 31, 41–44, and 62 | SN7404 Texas Instruments |
| Gates 36–39 | SN7408 Texas Instruments |
| Gate 55 | SN7430 Texas Instruments |
| Flip-flop 65 | SN7470 Texas Instruments |

-continued

| Reference Designation | Description |
|---|---|
| Flip-flops 45–47, 51, and 66 | SN7474 Texas Instruments |
| One-shots 56–59 | SN74123 Texas Instruments |
| Read-only-memory 40 | HPROM1-1024-5B Harris |

I claim:
1. A data converter for accepting first electrical signals indicative of a particular combination of tilt and rotational positions of a typewriter ball having a plurality of alpha-numeric characters and symbols, for accepting second electrical signals indicative of the upper or lower case condition of an alphabetical character that might be located at such particular combination of tilt and rotational positions of the typewriter ball, and for converting said first and second electrical signals to a binary bit coded electrical signal indicative of the alpha-numeric character or symbol located at such particular combination of tilt and rotational positions of the typewriter ball, comprising:
   a. means for providing a case control signal in response to said second electrical signals, said case control signal being of a first level in response to said second electrical signals indicating an upper case condition of an alphabetical character and of a second level in response to said second electrical signals indicating a lower case condition of an alphabetical character,
   b. means responsive to said case control signal for decoding said first electrical signals to provide a binary bit coded signal indicative of the alpha-numeric character or symbol and the upper or lower case of the character represented by such particular combination of tilt and rotational positions of a typewriter ball,
   c. means responsive to said second electrical signals for generating a first control signal for enabling said decoding means, and
   d. means for delaying said first control signal for a time interval sufficient to allow oscillatory transients associated with said first electrical signals to die away before the decoding of said first electrical signals.

2. The system of claim 1 wherein said means for delaying said first control signal includes a one-shot multivibrator.

3. The system of claim 2 wherein the time period of said one-shot multivibrator is greater than 5 microseconds.

4. The system of claim 1 further including:
   a. means responsive to said first control signal for generating a second control signal, and
   b. means for delaying said second control signal for a time interval sufficient to allow oscillatory transients associated with said binary bit coded signal to die away.

5. The system of claim 4 wherein said means for delaying said second control signal includes a one-shot multivibrator.

6. The system of claim 5 wherein the time period of said one-shot multivibrator is greater than 2 microseconds.

7. The system of claim 1 wherein said means for providing said case control signal includes a dual input flip-flop having a first of said second electrical signals indicative of an upper case condition applied to one of said dual inputs and having a second of said second electrical signals indicative of a lower case condition applied to the other of said dual inputs.

* * * * *